March 14, 1944.   J. M. LUERS   2,344,442
CUTTING-OFF BLADE
Filed Feb. 20, 1942

INVENTOR.
John M. Luers
BY
Gerald P. Baldwin

Patented Mar. 14, 1944

2,344,442

UNITED STATES PATENT OFFICE 2,344,442

CUTTING-OFF BLADE

John M. Luers, Mount Clemens, Mich., assignor to John Milton Luers Patents Incorporated, Detroit, Mich., a corporation of Michigan Application February 20, 1942, Serial No. 431,702

2 Claims. (Cl. 29—95)

This invention relates to improvements in cutting-off blades, and refers particularly to blades of the type wherein a head is formed longitudinally along one edge of the blade and a cutting edge is provided across the outer face or cutting surface of the head at one extremity thereof. In such a blade the opposite sides of the head, which project laterally beyond the sides of the blade throughout their height, are inwardly inclined from the cutting surface to provide lateral clearance, and the front extremity of the entire blade is downwardly and inwardly inclined from the cutting edge to provide rake or chip clearance.

In cutting-off blades of this type the natural tendency is for the cutting edge to wear away, particularly at the ends, and become blunt. It is found that if the grain paths on the opposite sides of the head are positively inclined—that is, downwardly and rearwardly inclined from the cutting surface assuming that the cutting edge is formed across the upper front extremity of the blade—the cutting edge will remain sharp longer. This is due to the fact that each grain path is then so disposed as to provide clearance for cutting; for when the grain paths are negative the action is the same, though of course on a vastly reduced scale, as extending the front of the entire blade downward and outward, instead of inward from the cutting edge. Again in cutting-off blades of this type it must be remembered that gradually greater portions of the opposite sides of the head lie contiguous to the sides of the cut being made in the work, and that positive inclination of the grain paths on these opposite sides again provides clearance and facilitates operation of the tool. This also minimizes the heating of the blade and it is the heat generated by cutting which is partly responsible for the breaking down of the cutting edge.

It is an object of this invention to provide such a cutting-off blade which is very durable, and wherein grain paths on the opposite sides of the cutting head are so formed that they provide natural clearance and tend to minimize wear of the cutting edge.

Another object of the invention is to provide such a cutting-off blade wherein grain paths formed on opposite sides of the cutting head facilitate the feeding of the blade into the work and minimize the tendency of the blade to heat when in operation.

A further object of the invention is to provide such a cutting-off blade wherein grain paths on the opposite sides of the head are disposed at a positive angle relative to the cutting edge, both to provide clearance at the ends of the cutting edge and upon the opposite head sides which travel into the work, and also to maintain such positive angles after each and every regrinding of the blade.

Having thus briefly stated some of the objects and advantages of the invention I will now proceed to describe it with the aid of the accompanying drawing, wherein.

Figure 1:
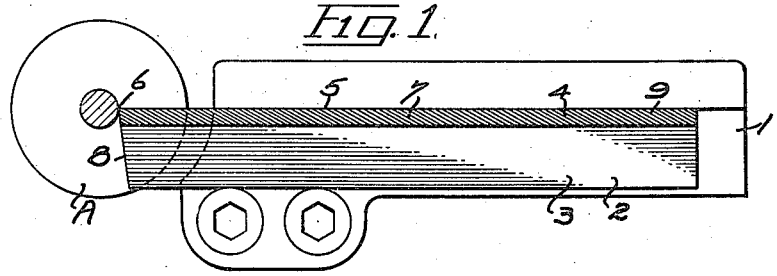
Figure 1 illustrates a cutting-off blade mounted in a conventional holder.
Figure 3:
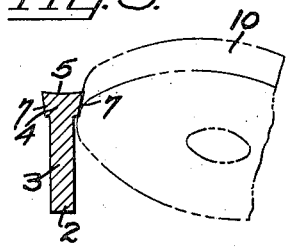
Figure 3 is a section on the line 3—3 of Figure 2 wherein the grinding wheel is again indicated.
Figure 2:
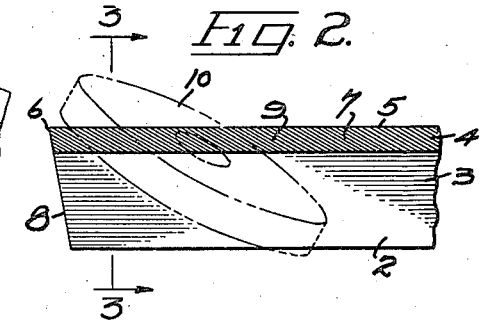
Figure 2 is a side view of the blade on which the direction of the grain paths is shown, and indicated thereon is a grinding wheel showing one inclination at which these positive grain paths may be formed.

Referring to the drawing, 1 designates a conventional tool holder in which a blade 2 is mounted, and A indicates a workpiece partly cut off by the blade. The blade 2 consists of a body 3 having a head 4 of increased width formed longitudinally along one edge. The outer edge face of the head 4 consists of a preformed cutting surface 5 extending throughout the length of the blade and has a cutting edge 6 formed across one extremity. The opposite sides 7 of the head which are inwardly inclined towards the body 3 extend outwardly beyond the latter throughout their entire height. The body 3 and head 4 of the blade are of uniform cross section throughout their entire length, and the extremity 8 of the blade across which the cutting edge 6 is formed is downwardly and inwardly inclined from the latter to provide clearance. The opposite sides 7 of the head 4 are provided with positively inclined grain paths as shown in exaggerated form at 9—that is, grain paths extending downwardly and rearwardly from the cutting surface 5 assuming that the cutting edge extends across the top, front extremity of the head. These grain paths 9 may extend at any such downward and rearward inclination at any angle of from 5° to 85° to the said cutting surface. Because at any inclination between these limits the grain paths provide a natural, positive clearance. 10 denotes a grinding wheel positioned to provide grain paths at the positive inclination shown in Figures 2 and 3.

Figure 4:
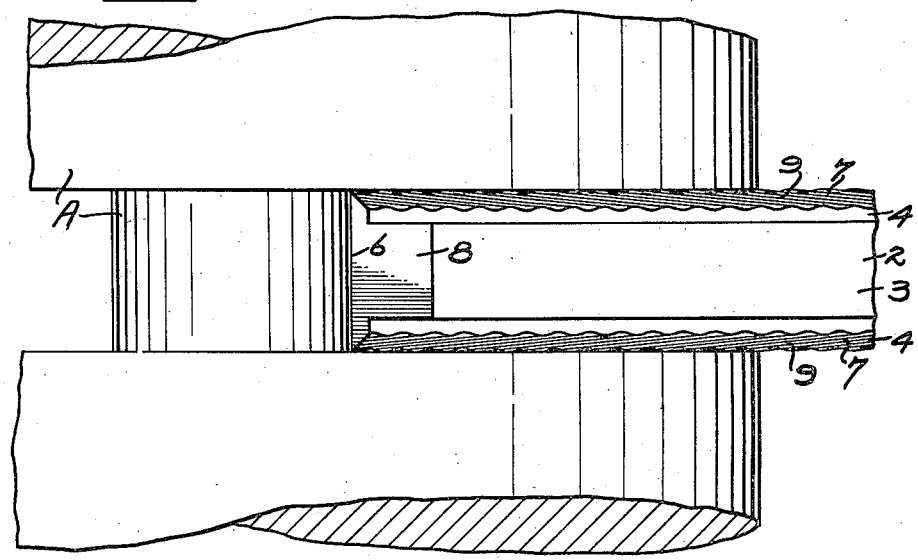
Figure 4 is an enlarged inverted plan view of the tool in work partially cut, showing the grain paths, very much exaggerated, on the opposite sides of the head of the blade.

The grain paths 9 shown in vastly exaggerated form in Figure 4 are inclined at a lesser angle to the cutting surface 5 but still at a positive and effective angle. 9a denotes the extremities of the grain paths at the upper and lower ends of the head sides which when thus exaggerated appear in the form of corrugations.

From the foregoing it will be clearly seen not only that the grain paths at the ends of the cutting edge are, and after regrinding of the blade end 8 always must be, positively inclined to the said cutting edge, but also that these grain paths are also positively inclined to the work as the tool is fed thereinto, both to facilitate the feeding of the tool and also to minimize heating of the blade during its operation.

While in the foregoing the preferred embodiment of the invention has been described and shown, it is understood that alterations and modifications within the scope of the claims may be made thereto.

What I claim is:

1. A blade having a narrow body and a wider head extending along one edge, a cutting surface formed along the outer edge face of the head throughout the length of the latter and having a cutting edge across its front extremity, the front of the blade being inclined rearwardly from the cutting edge, and the opposite sides of the head being inclined inwardly from the cutting surface and having ground grain paths thereon which are inclined rearwardly from said cutting surface.

2. A blade comprising a body rectangular in cross section having a wider head extending along one longitudinal edge, the outer edge face of the head forming a cutting surface having a cutting edge across its front extremity, the front of the blade being inclined rearwardly from the cutting edge, and the opposite sides of the head being inclined inwardly from the cutting surface to provide clearance beneath the latter, said opposite sides having ground grain paths thereon which extend rearwardly from the cutting surface at an inclination of from 5 to 85 degrees thereto.

JOHN M. LUERS.